US005909235A

United States Patent [19]

Folkins

[11] Patent Number: 5,909,235

[45] Date of Patent: Jun. 1, 1999

[54] WIDE AREA BEAM SENSOR METHOD AND APPARATUS FOR IMAGE REGISTRATION CALIBRATION IN A COLOR PRINTER

[75] Inventor: Jeffrey J. Folkins, Rochester, N.Y.

[73] Assignee: Xerox Corporation, Stamford, Conn.

[21] Appl. No.: 08/451,609

[22] Filed: May 26, 1995

[51] Int. Cl.[6] ................................ B41J 2/47; B41J 2/385; G01D 15/14; G03G 15/00

[52] U.S. Cl. ........................... 347/240; 399/372; 347/116

[58] Field of Search ..................................... 347/240, 155, 347/225, 256, 116, 251, 115; 399/372

[56] References Cited

U.S. PATENT DOCUMENTS

| | | | |
|---|---|---|---|
| 4,804,979 | 2/1989 | Kamas et al. | 347/116 |
| 4,807,218 | 2/1989 | Gerber | 347/256 |
| 4,903,067 | 2/1990 | Murayama et al. | 347/129 |
| 4,916,547 | 4/1990 | Katsumata et al. | 347/119 |
| 4,924,254 | 5/1990 | Dwyer, III | 355/20 |
| 4,963,899 | 10/1990 | Resch, III | 347/116 |
| 4,965,597 | 10/1990 | Ohigashi et al. | 347/118 |
| 5,278,587 | 1/1994 | Strauch et al. | 347/133 |
| 5,287,162 | 2/1994 | de Jong et al. | 399/49 |
| 5,347,303 | 9/1994 | Kovacs et al. | 347/118 |
| 5,394,223 | 2/1995 | Hart et al. | 347/116 |

*Primary Examiner*—N. Le
*Assistant Examiner*—Raquel Yvette Gordon
*Attorney, Agent, or Firm*—Tallam I. Nguti

[57] ABSTRACT

Disclosed is a color printer including an image bearing member having an imageable surface for movement along a preselected path, at least a first imaging assembly for forming sets of multiple black toner registration marks on different areas of the imageable surface, and for forming second sets of multiple non-black toner registration marks corresponding respectively to black marks in each set of the first sets of black marks so as to create a series of sets of multicolor registration marks. Each of the second sets is formed thus in accordance with a predetermined different condition of image misregistration relative to the corresponding first set of black toner marks. The color printer also includes a light source for producing a wide area beam (WAB) to illuminate each set of the series of sets of multicolor marks, and a wide area beam (WAB) sensor for measuring scattered or diffuse light reflected from each set of the illuminated series of sets of multicolor marks, and for producing an actual light reflectance measurement value from each such illuminated set. The printer further includes a comparing device for determining a degree of actual image misregistration by comparing each of the actual light reflectance measurement values with a stored predetermined registration offset value corresponding to a predetermined condition of image misregistration for each illuminated set of multicolor marks. Mechanisms are included in the printer for adjusting an imaging parameter of an imaging assembly responsively to the determined condition of actual misregistration so as to correct for the determined actual misregistration.

14 Claims, 8 Drawing Sheets

WIDE AREA BEAM SENSOR METHOD AND APPARATUS FOR IMAGE REGISTRATION CALIBRATION IN A COLOR PRINTER

BACKGROUND OF THE INVENTION

This invention relates generally to multicolor image printing, and more particularly to a wide area beam sensing method and apparatus for image registration calibration in a full color printing machine.

In a typical electrophotographic printing process machine, a photoconductive member is charged to a substantially uniform potential so as to sensitize the surface thereof. A portion of the charged photoconductive member is irradiated or exposed to a light image of an document being reproduced, thereby selectively dissipating charges thereon in the irradiated areas. This records an electrostatic latent image on the photoconductive member corresponding to the informational areas contained within the document. The latent electrostatic latent image recorded on the photoconductive member is then developed by bringing a developer material into contact therewith. Generally, the developer material comprises charged toner particles in a liquid, or adhering triboelectrically to dry charged carrier granules or other suitable toner supporting material. During such development, the charged toner particles are attracted to the latent image forming a toner image on the photoconductive member. The toner image is then transferred from the photoconductive member to a copy sheet, and then heated to permanently affix it to the copy sheet. The foregoing generally describes a typical monochrome, for example, black and white electrophotographic printing process machine.

Several methods representing variations from the monochrome or single color process are known for producing multicolor images. In general, to produce multicolor images, different color components of a composite color image are formed and then put together in registration to achieve the composite color image. One multicolor image production method, for example, involves a process utilizing a plurality of different color toner development units, a single photoreceptor, and a multiple image frames single pass approach in which the monochrome or single color process is repeated for three or four cycles. In each cycle a component latent image of a composite multicolor final color is formed, and a toner of a different color is used to develop the component latent image. Each developed component image as such is transferred to the copy sheet. The process is repeated, for example, for cyan, magenta, yellow and black toner particles, with each color toner component image being sequentially transferred to the copy sheet in superimposed registration with the toner image previously transferred thereto. In this way, several toner component images, as are in the composite image, are transferred sequentially to the copy sheet, and can then be heated and permanently fused to the sheet.

A second method for producing color copies involves what is referred to as the tandem method which utilizes a plurality of independent imaging units for forming and developing latent component images, and a moving image receiving member such as an intermediate transfer roller or belt. In this method, the toned or developed component images from the imaging units are transferred in superimposed registration with one another to the intermediate roller or belt, thereby forming the multicolor composite image on the belt or roller. The composite image then can be transferred in one step to a sheet of copy paper for subsequent fusing.

A third method for producing color copies involves a single frame, single pass Recharge, Expose, and Develop (REaD) process. The REaD process uses a single photoreceptor, a single image frame thereon, and four imaging units each including imagewise exposure means and a development station containing a different color toner of cyan, magenta, yellow or black. A composite subtractive multicolor image can thus be produced in a single pass, and on the single frame by charging, exposing and developing, then recharging, exposing and developing again utilizing this Recharge, Expose, and Develop (REaD) process architecture. In this process, digital version of the original or document is created pixel by pixel at a computer workstation or by a scanner. When created by scanning, light reflected from the original or document is first converted into an electrical signal by a raster input scanner (RIS), subjected to image processing, then reconverted into a light, pixel by pixel, by a raster output scanner (ROS). In either case, the ROS exposes the charged photoconductive surface to record a latent image thereon corresponding to the subtractive color of one of the colors of the appropriately colored toner particles at a first development station. The photoconductive surface with the developed image thereon is recharged and re-exposed to record a latent image thereon corresponding to the subtractive primary of another color of the original. This latent image is developed with appropriately colored toner. This process (REaD) is repeated until all the different color toner layers are deposited in superimposed registration with one another on the photoconductive surface. The multilayered toner image is transferred from the photoconductive surface to a sheet of copy paper. Thereafter, the toner image is fused to the sheet of copy paper to form a color copy of the original. The REaD process can also be performed as a multiple pass process.

In each of the color printing methods involving forming and transferring color component images in superimposed registration with one another, proper or precise registration of the images is usually an important and difficult problem. In order to deliver good quality color images, strict specifications are imposed on the accuracy with which a color image output terminal superimposes the various color separations.

Registration errors, for example, can arise from motion errors of the image receiving members, and from any mismatch between individual color separations. With respect to the motion of an image receiving member, such as that of an intermediate transfer member, good registration goals are attainable if the member is designed such that its kinematic errors are made synchronous with the spacing distance between successive points of image transfer to the member. In this manner, the modulation of its surface motion is repeatable (synchronous) with the imaging pitch and color-on-color separation errors are minimized. In such a case, even though the absolute position error of each color may be significant, the relative position error between colors can usually be held to an acceptable limit.

In tandem color image printers or output terminals, where the component color images or color separations are generated and developed on individual photoreceptors before being transferred to an intermediate belt, a mismatch in the motion errors of the photoreceptors can in addition also contribute to misregistration. A further cause of misregistration in such printers is associated with any eccentricity and wobble of the any of the photoreceptors. Motion mismatch errors for example contribute to misregistration in the process direction. Photoreceptor eccentricity contributes to variable lateral magnification errors which show up as misregistration, and wobble contributes to perceivable variations in lateral registration. Usually however, the eccentricity and wobble contributions exist only in machines where the latent image formation is performed through a finite angle by a light beam scanning system (usually called a ROS or Raster Output Scanner).

One known technique for improving registration is described in U.S. Pat. No. 4,903,067 to Murayama et al. and involves the use of a marking system and a detector for measuring alignment errors and mechanically moving individual color separation imaging units to correct misalignment. According to this technique, color printers that employ marks produced by each of the component or separation color imaging units in juxtaposition with each other, are thus enabled and able to correct lateral and longitudinal relative position, skew and magnification misregistration of the component images. The marks may be machine readable, and data may be processed to measure registration errors for the purpose of automating registration error correction. However, such corrections cannot compensate for the errors introduced by mismatch in the velocity variations of the photoreceptors because these errors differ both in phase and magnitude and are in no way steady or synchronous with the image transfer pitch. For example, a photoreceptor drum characterized by an eccentricity and wobble may rotate with an instantaneous rotational velocity that repeatedly varies as a function of the rotational phase angle such that an average rotational velocity over a complete rotation would inaccurately characterize the instantaneous rotational velocity at any single rotational phase angle.

The conventional detection system measures alignment errors in both the process direction and in a lateral direction, transverse the process direction, by detecting the position of, and determining the alignment error from the times of passage of, the centroids of registration indicia marks, such as lines, chevrons or other geometric shapes, past the centers of optical detectors, for example optical detectors. Detection and measurement of the position of each of the registration indicia marks may be accomplished by illuminating the marks and employing an optical system in an attempt to collect diffusely reflected light from the mark or transmitted light through the mark. The illumination may be in the visible wavelength or at near infrared (IR) wavelength.

The detection of color to color registration or misregistration, and the ability for correcting for detected misregistration, are very important in multicolor printing. Several techniques for doing so have been suggested and include the sensing of registration or misregistration between different color toner registration marks on a belt. One example of such techniques utilize a MOB [mark or mass on belt] sensor as a first position sensor for sensing a mark or mass of toner on a moving image carrying belt. The sensor does so by detecting the position or timing of individually colored toner mass developed lines on the moving belt. A controller connected to the output of the sensor determines the differences in the timing of the sensing of each line, and from such timing information determines the relative positions of the various lines.

In U.S. Pat. No. 4,804,979 issued Feb. 14, 1989, to Kamas et al., for example, a single pass color printer/plotter including a precise registration method is disclosed in which each print station monitors registration marks to detect variations of the media during printing, and corrects for such variations. The system includes a light source, an optical sensor array comprising a pair of sensors, and an optics control unit for detecting registration marks.

Similarly, U.S. Pat. No. 4,903,067 issued Feb. 20, 1990, to Murayama et al., discloses a multi-image forming apparatus including CCD array detectors for detecting the recording positions of registration marks on a belt.

U.S. Pat. No. 4,916,547 issued Apr. 10, 1990, to Katsumata et al., discloses a color image forming apparatus including reflection sensors comprising light emitting diodes and phototransistors having circuits for producing rectangular output wave signals.

U.S. Pat. No. 4,963,899 issued Oct. 16, 1990, to Resch, III, discloses a method and apparatus for image frame registration utilizing line indicia marks on an intermediate transfer belt, and bi-cell sensor arrays including photoemitter/photosensor pairs for detecting the indicia marks.

U.S. Pat. No. 4,965,597 issued Oct. 23, 1990, to Ohigashi et al., discloses a color image recording apparatus that superimposes a plurality of images having different colors to form a composite color image on a recording medium. Registration marks are formed on the recording medium at equal pitches. This occurs when it is transported through an image formation device in the apparatus. The apparatus also includes a sensor for sensing the registration marks and an edge sensor for sensing one edge or both edges of the recording medium. The mark sensor includes a source of light and a light receiving photosensor comprising a phototransistor, amplifiers and control circuits.

U.S. Pat. No. 5,278,587 issued Jan. 11, 1994, to Strauch et al., discloses a method and apparatus for color image on image registration utilizing a detector placed beneath the photoreceptor belt to provide a signal representing the exposure level of each scanning beam. Timing information derived from the detectors is used to control registration of the first scan line of each image sequence.

U.S. Pat. No. 5,287,162 issued Feb. 15, 1994, to deJong et al., discloses a method and apparatus for sensing and correcting image on image registration errors. The method and apparatus include use of bi-cell detectors or CCD array detectors for determining the timing of the passing of toner marks under the sensors.

Pending U.S. application Ser. No. 07/354,305 (Attorney docket D/92054) entitled "METHOD TO PROVIDE OPTIMUM OPTICAL CONTRAST FOR REGISTRATION MARK DETECTION" and Ser. No. 08/168,300 (Attorney docket D/94529) entitled "METHOD AND APPARATUS TO IMPROVE REGISTRATION IN A BLACK FIRST PRINTING MACHINE" each disclose a color image on image registration method and apparatus utilizing a bicell detector comprising a photoemitter photosensor pair for detecting toner registration marks on a photoreceptor belt.

U.S. Pat. No. 5,394,223 issued Feb. 28, 1995 to Hart et al, and commonly assigned, discloses a printing device for providing color prints of the type having a semi-transparent imageable surface adapted to move along a preselected path. The printing device also has at least one image processing station for forming a composite image on the imageable surface; means for marking indicia on the imageable surface; means for sensing the indicia to detect registration deviations from the preselected path of movement of the imageable surface; and means, responsive to the sensing means, for adjusting the image processing station to compensate for the detected registration deviations, thereby enhancing the registration of the composite image on the imageable surface. The sensor disclosed is a fixed position sensor that is located on the back side of a translucent moving image carrying belt, and directly opposite the point of ROS exposure of the charged front side of the moving belt. As such, at a non-black ROS/Imaging station (in a black first REaD printer), a previously developed black image on the front side of the belt will occlude or block the ROS exposure light from the backside sensor, thus providing timing information for proper registration of the black image and the non-black image of the particular imaging station.

Unfortunately, the MOB sensor and Eclipse sensor techniques as disclosed in the above references are based on a timing parameter, and therefore each requires exact and precise timing measurements. For such measurements, each therefore requires that the marks, lines or image edges being sensed be formed precisely, and be of high quality development. Such all around required precision necessarily demands high precision and costly sensors as well as costly electronics or controllers.

SUMMARY OF THE INVENTION

In accordance with the present invention, there is provided a relatively low cost wide area beam (WAB) sensing method of image registration in a color printer, having an electronic subsystem. The method includes the steps of storing in the electronic control subsystem a first and at least a second predetermined registration offset value corresponding to a first condition of image misregistration and to at least a second different condition of image misregistration, by the printer. The method also includes the step of creating a first set of multiple black toner registration marks on a first wide area of an imageable surface and at least a second set of multiple black toner registration marks on at least a second wide area of the surface. The method includes also forming a first set of multi-color registration marks by creating a set of multiple non-black toner registration marks relative to the first set of black toner registration marks, and in accordance with the first condition of image misregistration. This step then includes forming at least a second set of multicolor registration marks by creating another set of multiple non-black toner registration marks relative to each of the at least second set of black toner registration marks, and in accordance with the at least second condition of image misregistration.

The method further includes the step of producing a first and at least a second actual light reflectance measurement value by illuminating the first and the at least second sets of multicolor registration marks on the first wide area and on the at least second wide area, and then sensing the diffuse reflectance from each set of multicolor registration marks. This is followed by a step of comparing the produced first and at least second actual light reflectance measurement values with the stored predetermined first and at least second registration offset values in order to determine any actual measure of image misregistration. This step is then followed by a step of adjusting an image creating parameter of the color printer responsively to the determined actual measure of image misregistration so as to correct for such determined misregistration.

Pursuant to another aspect of the present invention, there is provided a color printer including an image bearing member having an imageable surface for movement along a preselected path, at least a first imaging assembly for forming sets of multiple black toner registration marks on different areas of the imageable surface, and for forming second sets of multiple non-black toner registration marks corresponding respectively to black marks in each set of the first sets of black marks so as to create sets of multicolor registration marks. Each of the second sets is formed thus in accordance with a predetermined different condition of image misregistration relative to the corresponding first set of black toner marks.

The color printer also includes a light source for producing a wide area beam to illuminate each set of the sets of multicolor marks, and a wide area beam (WAB) sensor for measuring scattered or diffuse light reflected from each of the illuminated set of sets of multicolor marks, and for producing an actual light reflectance measurement value from each such illuminated set. The printer further includes a comparing device for determining a degree of actual image misregistration by comparing each of the actual light reflectance measurement values with a stored predetermined registration offset value corresponding to a predetermined condition of image misregistration for each illuminated set of multicolor marks. Mechanisms are included in the printer for adjusting an imaging parameter of the at least first imaging assembly responsively to the determined actual misregistration so as to correct the determined actual misregistration.

Other features of the present invention will become apparent from the following drawings and description.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment of one type of an electrophotographic color printer, it will be understood that it is not intended to limit the invention to that embodiment. On the contrary, it is intended to cover all alternatives, modifications, and equivalents as may be included within the spirit and scope of multicolor image registration of the invention as defined by the specification and appended claims.

Inasmuch as the art of electrophotographic printing is well know, the various processing stations employed in the FIG. 9 printing machine will be shown hereinafter only schematically, and their operation described only briefly with reference thereto.

Figure 9:
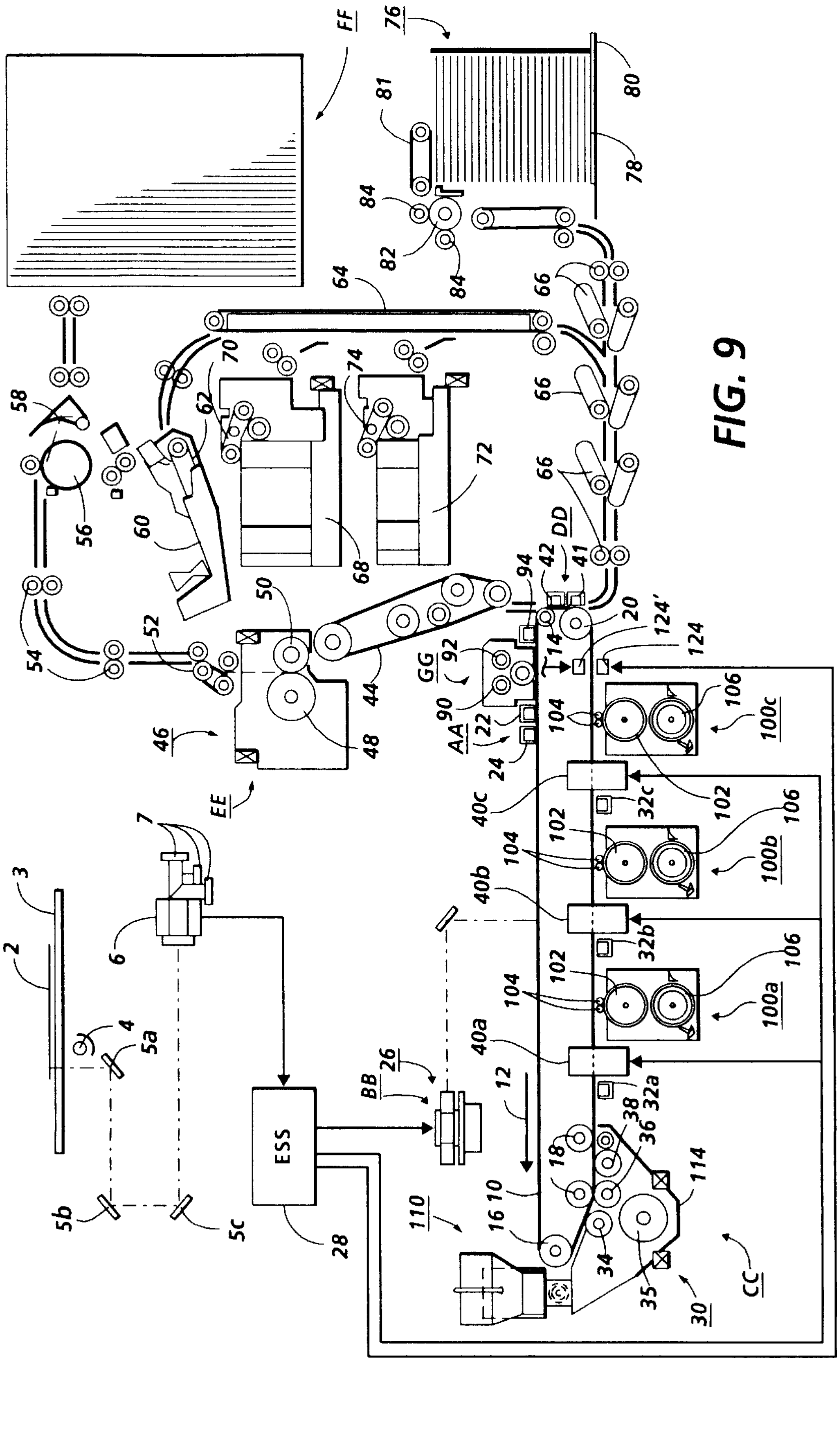
FIG. 9 is a schematic elevational view depicting an illustrative electrophotographic color printing machine incorporating the WAB sensor and features of the present invention.

Referring now to FIG. 9, a black-first single pass REaD (Recharge, Expose and Develop) electrophotographic printing machine is illustrated for producing multicolor copies of images in proper registration. Note that such a machine can also be a multiple pass machine. The color copy process of such a machine typically involves a computer generated digital color image which may be inputted into an image processor unit (not shown), or alternately a digital image can be created by scanning from a color document 2 placed on the surface of a transparent platen 3. A scanning assembly having a halogen or tungsten lamp 4 is used as a light source to illuminate the color document 2. The light reflected from the color document 2 is reflected by mirrors 5*a*, 5*b* and 5*c*, through lenses (not shown) and a dichroic prism 6 to three charged-coupled devices (CCDs) 7 where the information is read. The reflected light is separated into the three primary colors by the dichroic prism 6 and the CCDs 7. Each CCD 7 outputs an analog voltage which is proportional to the strength of the incident light. The analog image signal from each CCD 7 is converted into an 8-bit digital image signal for each pixel (picture element) by an analog/digital converter. The digital image signal enters an image processor unit. The output voltage from each pixel of the CCD 7 is stored as a digital signal in the image processing unit. The digital signals which represent the blue, green, and red density signals is converted in the image processing unit into four bitmaps: yellow (Y), cyan (C), magenta (M), and black (Bk). The bitmap represents the exposure value for each pixel, the color components as well as the color separation.

The electrophotographic printing machine of the present invention employs a photoreceptor or photoconductive belt 10 that preferably is black or has a "black" appearance or light non-scattering surface. As is well known, where the light source and light sensor for image registration measurement are to be located on opposite sides of the photoreceptor, the photoreceptor preferably should be semi-transparent in order to allow the transmission of light. Photoconductive belt 10, for example, is made from a photoconductive material coated on a ground layer, which, in turn, is coated on anti-curl backing layer. Belt 10 moves in the direction of arrow 12 to advance successive portions of the photoconductive surface 11 sequentially through various processing stations disposed about the path of movement thereof. Belt 10 is entrained about stripping roller 14, tensioning roller 16, idler rollers 18, and drive roller 20. Stripping roller 14 and idler rollers 18 are mounted rotatably so as to rotate with belt 10. Tensioning roller 16 is resiliently urged against belt 10 to maintain belt 10 under the desired tension. Drive roller 20 is rotated by a motor coupled thereto by suitable means such as a belt drive. As roller 20 rotates, it advances belt 10 in the direction of arrow 12.

Initially, a portion of the photoconductive surface passes through charging station AA. At charging station AA, two corona generating devices, indicated generally by the reference numerals 22 and 24, charge photoconductive belt 10 to a relatively high, substantially uniform potential. Corona generating device 22 places all the required charge on photoconductive belt 10. Corona generating device 24 acts as a leveling device, and fills in any areas missed by corona generating device 22.

Next, the charged portion of the photoconductive surface is advanced through at least a first imaging station BB. At imaging station BB, the uniformly charged photoconductive surface is exposed by a latent imager, such as a laser based output scanning (ROS) device 26, which causes the charged portion of the photoconductive surface to be discharged in accordance with the output from the scanning device. The scanning device is a laser raster output scanner (ROS). The ROS performs the function of creating the output image copy on the charged photoconductive surface 11. It creates the image in a series of horizontal scan lines with each line having a certain number of pixels per inch. The ROS may include a laser with rotating polygon mirror blocks and a suitable modulator or, in lieu thereof, a light emitting diode array (LED) as a write bar.

An electronic subsystem (ESS) 28 is the control electronics which prepare and manage the image data flow between the imaging processing unit and the ROS. ESS 28 may also include a display, user interface, and electronic storage, i.e. memory, functions. The ESS is actually a self-contained, dedicated mini computer. The photoconductive surface 11, which is initially charged to a high charge potential, is selectively discharged by the ROS thus recording a charged pattern or electrostatic latent image corresponding to the black color portion of the information desired to be printed. In addition to this charge pattern of the black color portion, the ROS 26 can also selectively write on photoconductive surface 11 (FIG. 5) latent forms of sets S1, S2, S3, S4 and S5 of multiple black registration marks or registration calibration indicia in accordance with the present invention (to be described in detail below). Preferably, the latent sets of multiple black registration marks are written within the margin adjacent to frame portions of the surface 11 containing the latent image or image charge pattern.

At development station CC, a magnetic brush development system for example, indicated generally by the reference numeral 30 advances developer material consisting of carrier granules and charged black toner particles into contact with the electrostatic latent image and with any latent registration marks in the margin. The development system typically comprises a plurality of three magnetic brush developer rollers, indicated generally by the reference numerals 34, 36 and 38. A paddle wheel 35 picks up developer material from developer sump 114 and delivers it to the developer rollers. When developer material reaches rolls 34 and 36, it is magnetically split between the rolls with half of the developer material being delivered to each roll. Photoconductive belt 10 is partially wrapped about rolls 34 and 36 to form extended development nips. A magnetic roller, positioned after developer roll 38, in the direction of arrow 12, is a carrier granules removal device adapted to remove any carrier granules adhering to belt 10. Thus, rolls 34, 36, and 38 advance developer material into contact with the electrostatic latent image and the sets of latent registration marks.

The latent image and any selectively written latent sets of multiple registration marks then attract charged black toner particles from the carrier granules of the developer material to form a developed black toner powder image, and black toner powder registration marks, on the photoconductive surface 11 of belt 10. A black toner dispenser 110 dispenses new black toner particles into sump 114. Each of the foregoing developer rollers includes a rotating sleeve having a stationary magnet disposed interiorly thereof. The magnetic field generated by the magnet attracts developer material from paddle wheel 35 to the sleeve of the developer roller. As the sleeve rotates, it advances the developer material into the development nip where toner particles are attracted from the carrier granules to the charged area latent image and to any latent registration marks. In this way, the charged area latent image and the latent registration marks are developed with black toner. In accordance with one aspect of the present invention, the black toner registration marks can be formed as above by ROS 26 and development system 30 so as to be 4, 5 or 6 image frames in advance of the black toner image. As such, when the black toner image is at the development station CC, the sets of registration marks S1, S2, S3, S4 and S5 can already be at the sensor 124 shown after the fourth development system 100C.

In any case, after the development station CC, each of the black toner developed image and the black toner developed registration marks continue to advance with photoconductive belt 10 in the direction of arrow 12 to a recharging station including a corona generator 32*a*. Corona generator 32*a* recharges the already imaged photoconductive surface 11 of belt 10. The recharged surface 11 then moves to a second latent imaging or exposure station 40*a* which for example includes an LED image array bar, an LCD shutter image bar, or another ROS. The imaging station 40*a* is used as such to superimpose a subsequent color latent image by selectively discharging in registration the recharged photoconductive surface 11 of belt 10 in accordance to the calibrated and adjusted image registration method of the present invention. Similar subsequent color latent image formation in registration is also carried out at imaging stations 40*b* and 40*c* as shown following similar recharging by corona devices 32*b* and 32*c*.

Figure 1:
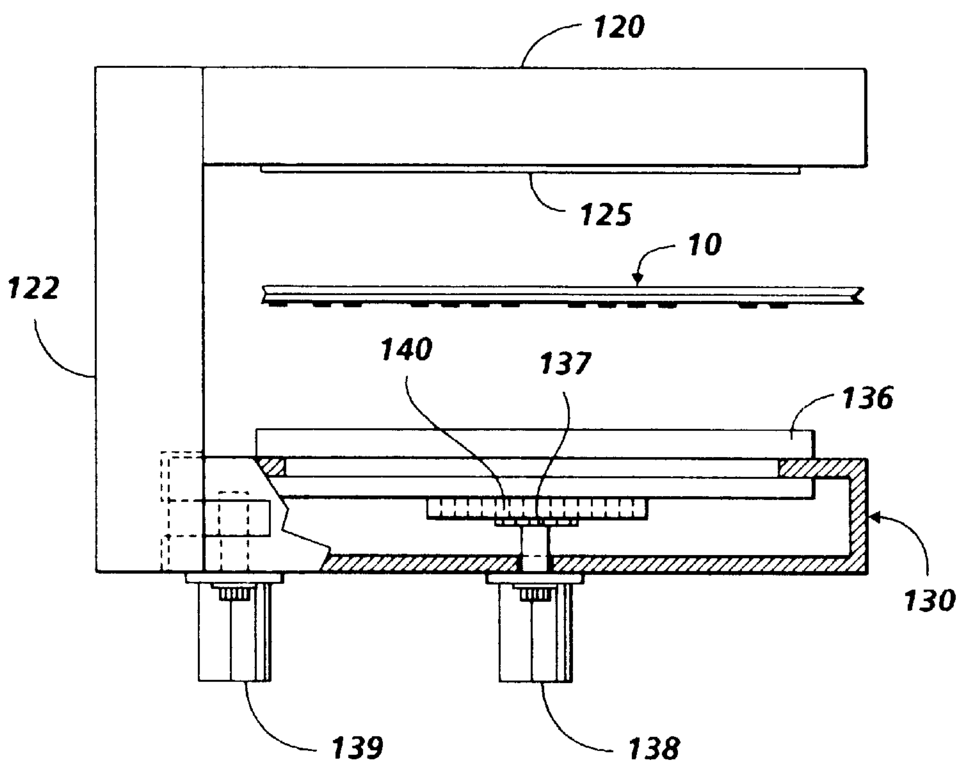
FIG. 1 shows a side view of an imaging station including mechanisms for correcting for actual misregistration determined in accordance with the present invention.
Figure 2:
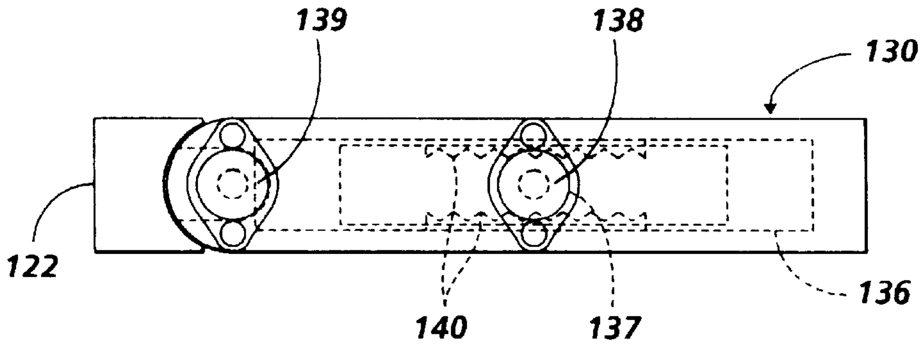
FIG. 2 shows a top view of the imaging station of FIG. 1.

Referring now to FIGS. 1 and 2, each imaging station 40*a*, 40*b* and 40*c* specifically includes an outer housing 130 that is mounted on a support frame 122. As is also shown, each imaging station includes an imagewise charge erasing image bar or ROS 136 that is also secured to the outer housing 130. In the case where the photoreceptor 10 is semi-transparent, each imaging station may also, or instead, include an inner housing 120 which is mounted on the support frame 122. According to the present invention, a light source such as an erase lamp 125 may also be provided and secured to the inner housing 120 for illuminating a transparent photoreceptor from the backside. As is well known, such an erase lamp may also be secured instead to the outer housing 130 for illuminating the front side of the photoreceptor or belt 10.

Still referring to FIGS. 1 and 2, the inner housing 120 and the outer housing 130 are arranged so that the photoconductive belt 10 is disposed therebetween as shown. The image bar or ROS 136 is mounted on the outer housing 130 by a slide mount arrangement 137 which allows translation and hence corrective positional adjustment of the ROS 136 in a plane substantially parallel to the belt 10 in accordance with the present invention. Further, the outer housing 130 is pivotally connected to the support frame 122 in order to permit angular translation thereof in the plane of the belt 10. A stepper motor 138 is mounted on the outer housing 130 in a suitable fashion. Actuation of the stepper motor 138 selectively translates the image bar or ROS 136 in a forward or reverse manner in the slide mount 137. Thus, actuation of the stepper motor 138 drives the image bar 136 in a linear fashion with respect to the inner housing 120 and belt 10. It will be appreciated that stops (not shown) may be provided in the outer housing to limit the travel of the image bar 136 relative to the inner housing 120. A second stepper motor 139 is mounted on frame 122 and its actuation causes the outer housing 130 to rotate and, consequently, image bar or ROS 136 to also rotate. In this embodiment, stepper motors 138 and 139 have relatively small incremental step actuations utilizing gear reduction units (not shown) incremented approximately in 0.001 mm divisions which is a fraction of a pixel width. As such, the image bars 136 can be linearly actuated and, further, can be rotationally actuated to change the orientation of an image bar 136 at each of the imaging stations 40*a*, 40*b* and 40*c* relative to the photoconductive belt 10. The stepper motors 138 and 139 in each of the imaging stations 40*a*, 40*b* and 40*c*, are actuated by control signals from the ESS 28. Accordingly, actual image misregistration determined in accordance with the present invention can be corrected by adjusting the position of an imager 136 and or the position of the belt 10.

Figure 3:
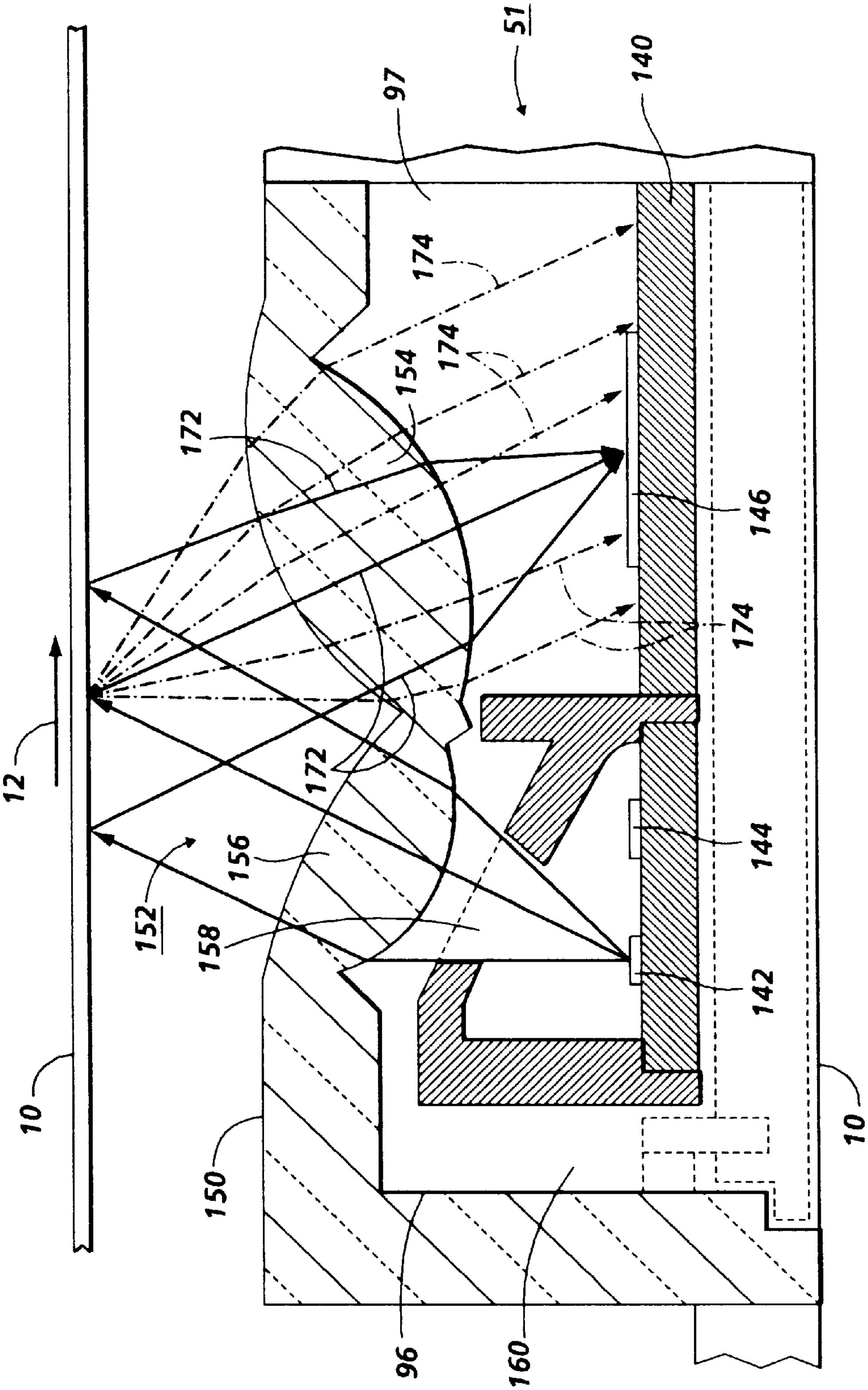
FIG. 3 is a fragmentary, sectional elevational view of a wide area beam (WAB) sensor for use in accordance with the present invention.

Referring now to FIG. 3, an example of a wide area beam (WAB) sensor 124, 124'(for backside use) according to the present invention is illustrated. The example illustrated is a "Toner Area Coverage Sensor" known as TACS, and is disclosed for example in U.S. Pat. No. 4,989,985, incorporated here by reference. As shown, the sensor 124, 124' includes a housing 96 that defines a chamber 97. A cover 98 encloses a bottom of the housing 96. A printed circuit board 140 within the housing 96 supports a suitable light emitting diode (LED) 142 for providing light rays to illuminate toner particles adhering to the surface of the photoreceptor belt 10. A control photodiode 144 and a photosensor or photodiode array 146 are also mounted on the board 140. As is well known, suitable electrical components including a connector (not shown) are provided for connecting the LED 142, photodiode 144, and photodiode array 146.

A top surface 150 of the housing 96 defines a v-shaped recess 152 that includes two surfaces. One surface supports a collector lens 154, and the other a collimating lens 156. The LED 142 generates near infrared light rays that are transmitted through an aperture 158 and a cavity 160 onto the collimating lens 156. The lens 156 collimates the light rays and focuses them onto the toner particles on the belt 10. Photodiode 144 is positioned to receive a portion of the LED radiant flux reflected from the walls of the cavity 160. An output signal from the photodiode 144 is compared with a reference signal and the resultant error signal is used to regulate current input to LED 142 to compensate for LED aging and thermal effects. Light rays reflected from toner particles on the belt 10 are collected by the collecting lens 154 and directed onto the surface of of photodiode array 146 which produces a total signal proportional to a total flux of the light rays being transmitted through the collecting or collector lens 154, as well as a diffuse signal component that is proportional to a diffuse component of the total flux.

The specular component of the reflected rays or flux, as shown by the arrows 172, is focused on a small spot on the surface of a central segment of the photodiode array 146. The diffuse components of the reflected rays or flux, as shown by arrows 174, flood the entire surface of the photodiode array 146. Edge photodiodes (not shown) of the photodiode array 146 are positioned therein to receive only the diffuse component of the reflected light rays or flux as transmitted through the lens 156. Hence the electrical signal generated by the edge photodiodes is proportional to only the diffuse or scattered component of the reflected light rays. Thus according to the present invention, each of the wide area beam (WAB) sensors 124, 124' is suitable for measuring scattered or diffuse reflected light from over a wide area, as opposed to a line or an edge. As such, it can measure the diffuse reflectance from an area holding each illuminated set S1, S2, S3, S4, and S5 (FIG. 5) of the plural sets of multicolor registration marks on the belt 10, and thus produce an actual light reflectance measurement value (Ca1, Ca2, Ca3, etc. (FIGS. 7–8) that is proportional to the diffuse component, from each illuminated set of multicolor marks.

Accordingly, the sensor 124, 124' uses flux from the infrared LED 142 to measure the proportion of photoreceptor surface that is covered with light reflecting toner, such as color or non-black toner. The sensor as such ordinarily enables low cost measurement of the developability over an area of all colored xerographic toners. In accordance with the present invention, it is important that the wide area beam sensor 124, 124' is sensitive to wavelengths of light reflected from toners on marks formed by each imager 40*a*, 40*b*, and 40*c*.

Figure 4:
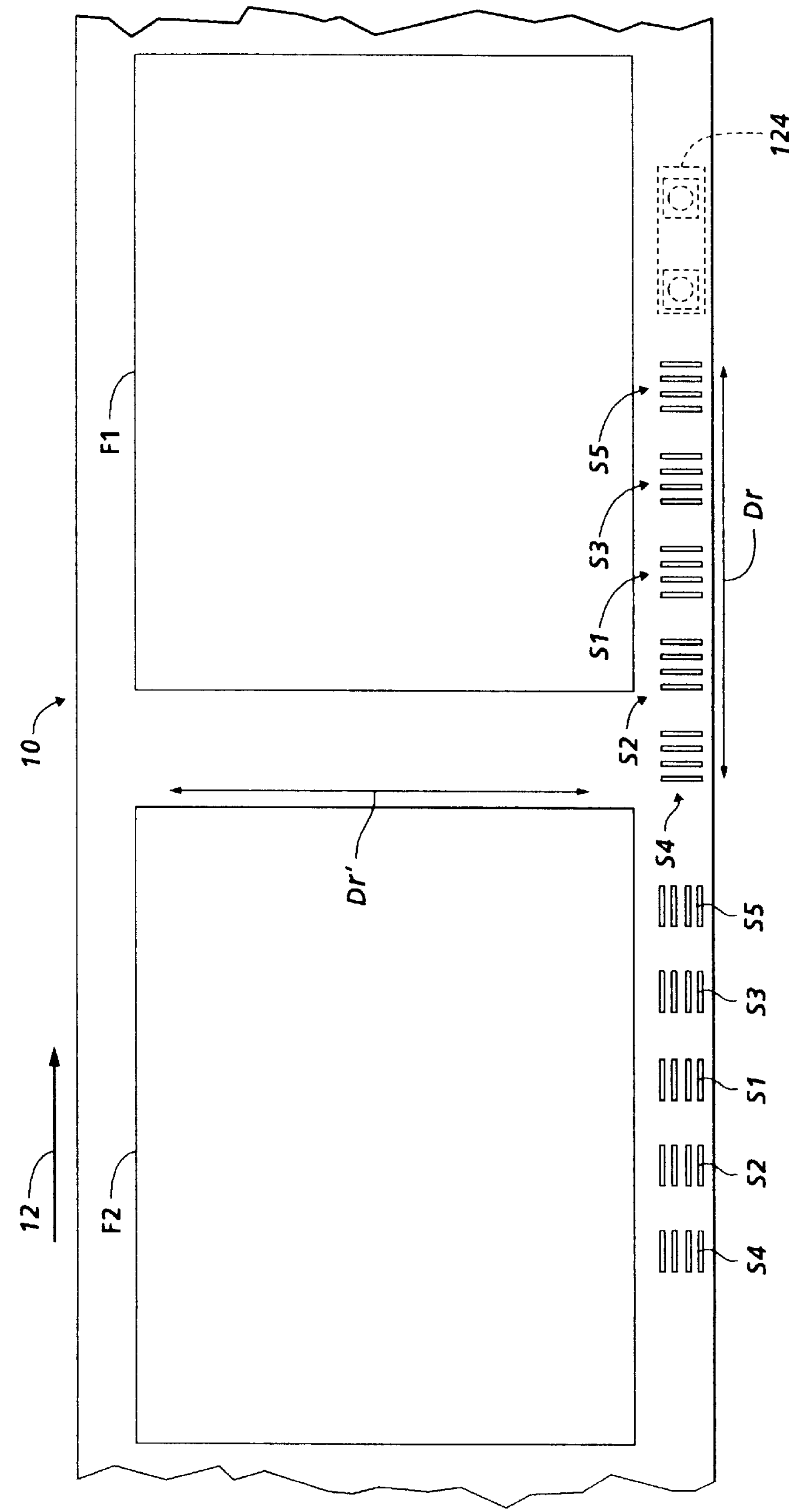
FIG. 4 shows a top schematic view of an imaging surface and illustrates a WAB sensor for in-track and cross-track sets of registration marks in accordance with the present invention.
Figure 5:
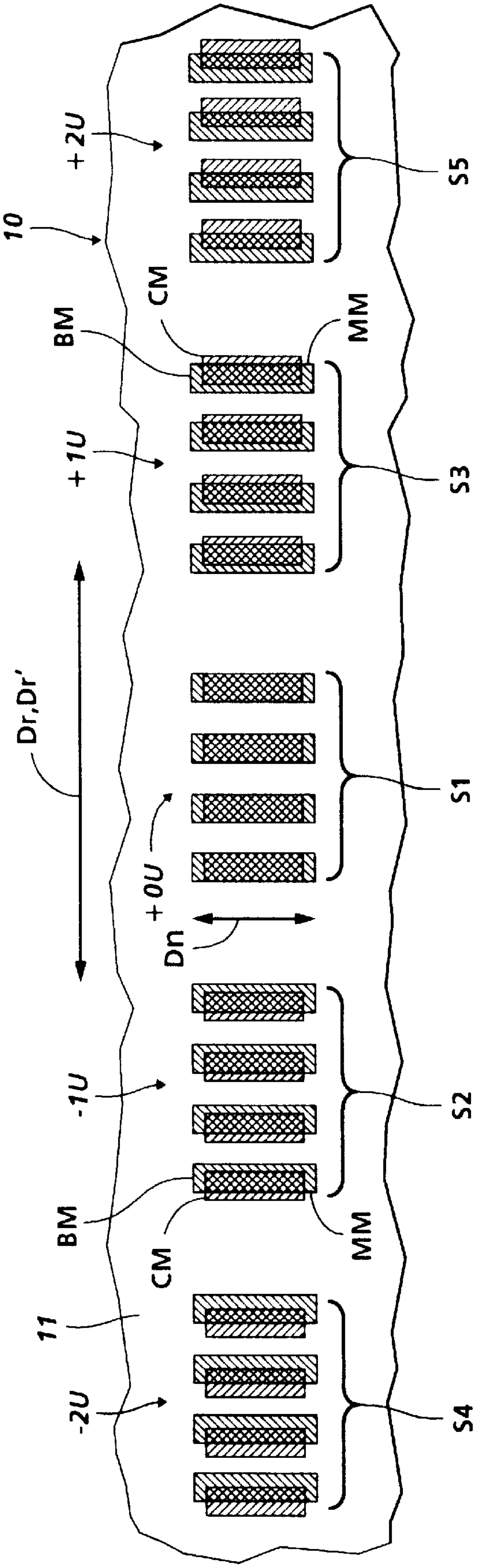
FIG. 5 shows an enlarged illustration of the sets of registration marks of FIG. 4 with prebuilt-in conditions of offset or misregistration according to the present invention.

Referring now to FIGS. 4–9, other apparatus components, and the method of the present invention are illustrated for achieving wide area beam (WAB) sensing for image registration in a color printer having an electronic subsystem such as ESS 28. As shown in FIGS. 4, 5 and 9, an image bearing member such as the belt 10 having an imageable surface 11, is movable along a preselected path in the direction of the arrow 12. This is also the in-track or process direction shown by the two-headed arrow Dr (FIG. 5). The cross-track direction is shown by the two-headed arrow Dr'. As discussed above, the surface 11 should appear "black" to the sensor 124. The sensor 124 is mounted along the path of belt 10 such that the sets of registration marks S1, S2, S3, S4 and S5 are formed centered inboard and outboard positionwise with respect to the sensor 124.

Alternatively, as can be the case in non REaD process color machines as discussed in the background above, the surface 11 on which toner images and toner registration marks are formed can be that of an intermediate transfer member as used in tandem and in multiple pass color process machines. It is also possible for the surface 11 to be the surface of an image receiving substrate such as that of a copy sheet of paper. Paper surfaces as such however are usually "white" appearing. As such, the method of the present invention would work in such process machines only where the black toner marks are printed first onto an intermediate member and then reversed transferred onto the sheet of paper. In a REaD machine as in FIG. 9, it is preferable as shown, to print the black toner marks or images first on a black appearing or non-reflecting surface. In any case, the surface 11 is any surface on which the multiple layers of different color toner images and marks are formed in any of the color machine processes discussed in background above. According to the present invention, however, measurements and determination of image misregistration must be made before a toner fusing step in the particular machine process.

In any of such machines, the method of the present invention only allows for the measurement and registration of different color toner images one at a time against a black toner image formed first preferably, or formed last. Accordingly, as shown in FIGS. 9 and 5, a first imager or imaging assembly 26, 30 (FIG. 9) is provided for forming a plural number of first sets S1, S2, S3, S4 and S5 (FIG. 5) of space apart black toner registration marks BM. It is preferred that at least 5 such sets be formed for best averaging results. Each such first set is formed space apart from the others and on a different area of the imageable surface 11. As shown, each such set preferably includes multiple spaced apart marks. For example, each set is shown in FIG. 5 as including four spaced apart marks, but the actual number of marks can equally be varied from two to about 5 or any selected number each being spaced from an adjacent mark.

At least a second imaging assembly, such as the images 40*a*, 40*b*, 40*c* (FIG. 9) is also provided for forming a plural number of second sets of color or non-black toner registration marks CM in such a manner that each set of each of the second sets corresponds to a set S1, S2, S3, S4 and S5 of black toner registration marks BM. Note that the set designations as S1, S2, S3, S4 and S5 will remain the same for black, color and multicolor marks since color toner marks are merely formed relative to black toner marks in existing black toner mark sets S1, S2, S3, S4 and S5. Each of the color marks CM of each such second set are formed relative to its corresponding black mark BM of a first, black toner marks set, so as to result in corresponding plural sets of multicolor registration marks MM.

In electronic printers, each set of multicolor marks MM so formed consists of bitmaps for both black toner marks BM and color toner marks CM. In addition, each of the color marks CM of each such second set are formed relative to its corresponding black mark BM of a first set so as to be in accordance with, or in alignment therewith according to a predetermined different condition (−2U, −1U, +0, +1U and +2U (FIGS. 5–8)) of image offset or misregistration relative to the corresponding black mark BM of the first set of marks. As used here, "U" can be any unit of image registration, preferably a spatial unit, that is selected. This scheme is true for the process direction or in-track registration marks, and as well for the cross-process registration marks that are formed parallel to the process direction (FIG. 4). In FIG. 5 the prebuilt-in different conditions or degrees of image misregistration have been illustrated relative to the sets as follows: S1=+0; S2=−1U; S3=+1U; S4=−2U; and S5=+2U, but can well be in any selected order. As shown, in order to form multicolor marks MM, the black and color toner marks BM, CM respectively are made to overlap due to the predetermined shift or offset in their registration. A preferred pattern for these marks is a series of one pixel "on "/one pixel "off" perpendicular lines. Other image patterns however can also be formed in accordance with the predetermined conditions or degrees of image misregistration.

As shown clearly in FIG. 5, in order to isolate and increase the precision of measurements of misregistration only in the direction Dr, or Dr' (i.e. in-process or cross-process) selected for control, the color marks CM are made equal in dimension to black marks BM in such control direction Dr, Dr', but are centered to, and made less in dimension than the black mark in the non-control direction shown as Dn. As such any misregistration of the color marks on the black marks in the non-control direction Dn will be occluded by the black marks, and hence will not affect the sensor output value. For in-process registration control with sensor 124, the non-control direction Dn is of course the cross-process direction and vice versa. Alternatively, the sensor can be made relatively less in dimension in the non-control direction than the marks themselves. As such any misregistration in the non-control direction will fall beyond the sensing reach of the sensor, and hence will not affect the output.

The light source 142 (FIG. 3) of the present invention preferably includes colors or spectral intensities that can be scattered by all the colored toners such as Cyan, Magenta and Yellow, but not black. Each is mounted so as to produce a wide area beam that illuminates a wide area holding each set S1, S2, S3, S4 and S5 of the multicolor marks MM. For the low cost purposes of the present invention, the light source and sensor need only to have an optical resolution of less than 10 mm width. When the resolution is less than a typical line spacing of a few pixels, for example of 100 um, then the sensor 124, 124'(backside), and the electronics or signal processor of the sensor must be capable of averaging measurements over relatively larger areas. The wide area beam method of the present invention is particularly effective because the best signal to noise ratio for such measurements is obtainable from large area measurements as opposed to fine line or image edge timing measurements in the case of MOB sensors. Optimally, the area coverable by the width of the light source beam and the area covered by the registration marks should be selected so as to be comparable in size.

The wide area beam (WAB) sensor 124 of the present invention is mounted (FIGS. 4 and 9) suitably at a diffuse angle for measuring scattered or diffuse light reflected from each illuminated set S1, S2, S3, S4 and S5 of multicolor marks MM, and for producing an actual light reflectance measurement value pertaining to each such illuminated set. When the sensor is placed at a diffuse angle, (the preferred mounting angle according to the present invention), the surface 11 however appears "black". Note that in the case of paper surfaces, the particular angle is immaterial because such surfaces create so much diffuse scattering of light there is therefore no difference between specular and diffuse angle positioning of the sensor. All in all, the sensor must be able to detect at least the wavelengths of the light scattered by the color toner marks.

The electronic subsystem or ESS 128 (FIG. 9) serves as a comparing device for determining a degree of actual misregistration by comparing each actual light reflectance measurement value with a stored predetermined registration offset value corresponding to a particular predetermined condition of image misregistration for each illuminated set of multicolor marks MM. Finally of course, the adjustment mechanisms 137, 138, 139 are provided for adjusting an imaging parameter such as time or position, of at least one of the first or second imaging assemblies 26, 40*a*, or the position of the belt 10 responsively to the determined condition or degree of actual misregistration so as to correct such actual misregistration.

Referring again to FIG. 4 the registration calibration marks preferably are formed as shown in a margin area of the surface 11, so as to allow for the making of image registration calibration measurements concurrently with process imaging. The process direction series of calibration line marks are formed so that the lines run orthogonally to the process direction. The cross-procees direction series of registration calibration line marks are shown formed so that the lines run parallel to the process direction. Either series of these marks could equally be formed within interframe areas between imaging frames such as frames F1, F2, provided the sensor is appropriately also relocated.

Figure 6:
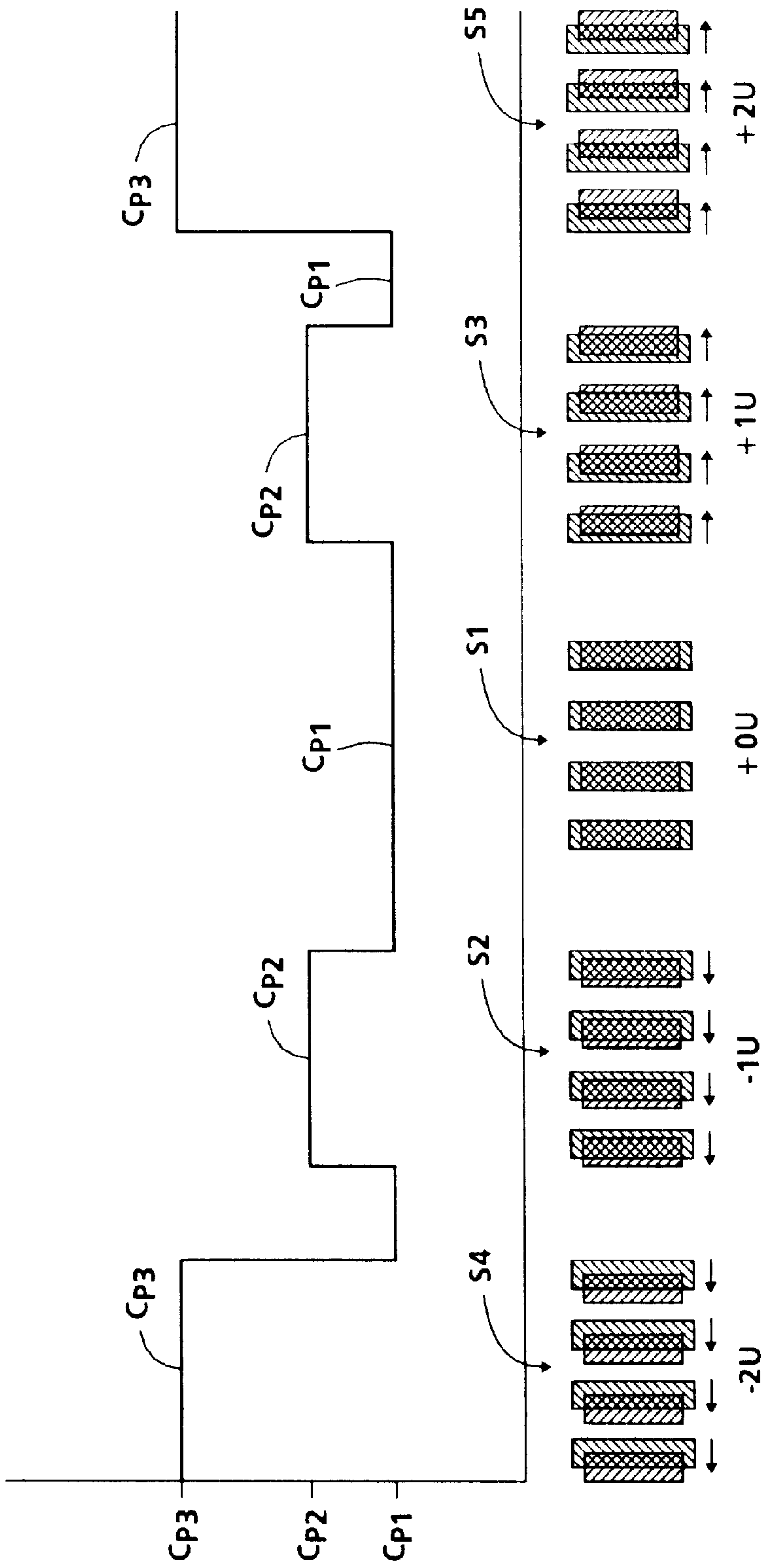
FIG. 6 illustrates a plot of registration offset values or reflectance signals representation from the sensor of FIG. 4 given ideal pre-bulit-in offset or misregistration of the compound marks.

The method of the present invention includes the step of storing in the electronic control subsystem (ESS) 128 a plural number (3) of predetermined registration offset values (Cp1, Cp2, Cp3 (FIGS. 6–8)). These include a first value Cp1 that is a threshhold value for when there is no diffuse reflection as in the ideal case of set S1=+0 misregistration (FIG. 6) where all the color toner marks CM, because they are properly registered, are occluded by the corresponding black toner mark BM. In addition, the predetermined registration offset values include at least a second value Cp2 for the at least second set S2=−1U, S3=+1U each having a built-in different condition of image misregistration. As shown in FIG. 6, the predetermined registration offset values also include a third value Cp3 for the sets S4=−2U, S5=+2U also each having another built-in different condition of image misregistration. For a simplified illustration, the second predetermined registration offset value Cp2 is made to be the same (as expected) for conditions of misregistration −1U and +1U. The same is true for the third value Cp3 with respect to conditions of misregistration −2U and +2U.

Figure 7:
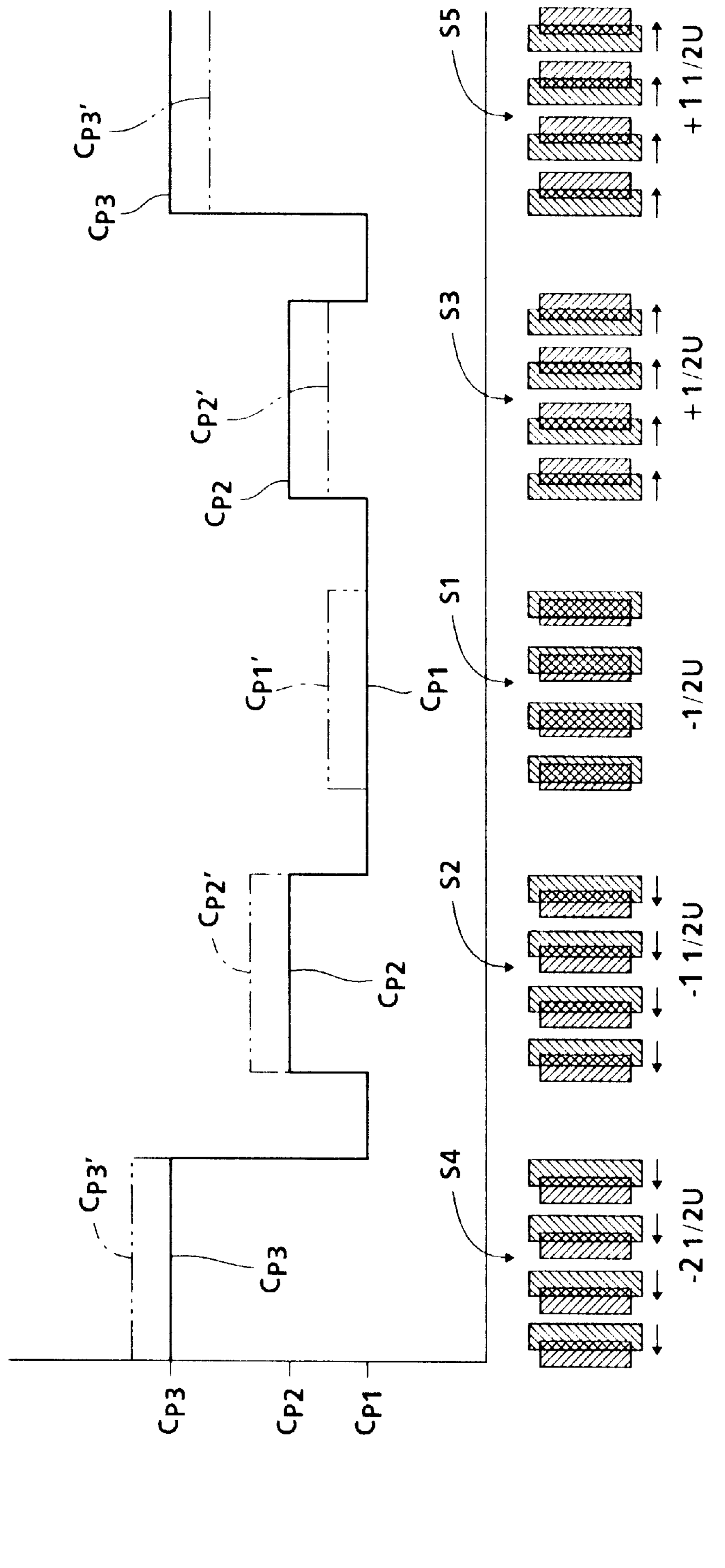
FIG. 7 illustrates a plot of light reflectance measurement values from the sensor of FIG. 4 given a measured actual situation of image misregistration to the left or negative direction of FIG. 7.
Figure 8:
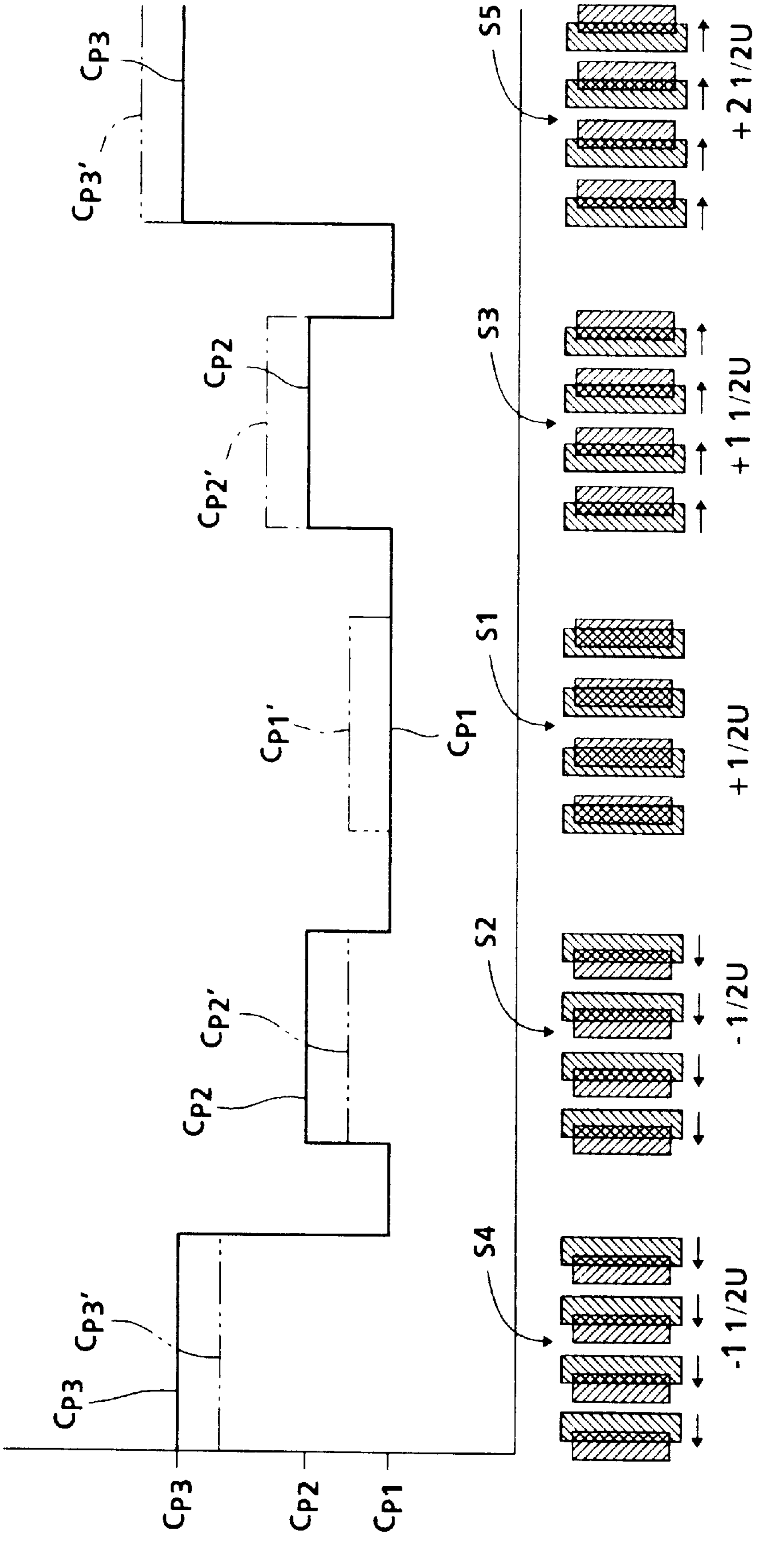
FIG. 8 illustrates a plot of light reflectance measurement values from the sensor of FIG. 4 given a measured actual situation of image misregistration to the right or positive direction of FIG. 8.

As illustrated in FIGS. 7–8, the method of the present invention then includes the step of the first imaging assembly 26 creating the first set S1 of black toner registration marks BM on a first wide area and at least the second set S2, S3, S4 or S5 of black toner registration marks BM on at least a second wide area of the photoconductive image bearing surface 11 of belt 10. This can be done during a cycle-up or cycle down time of the printer, or during a process imaging cycle of the printer. The method includes also forming the multi-color registration marks MM from the set S1 by the second imaging assembly 40*a*, for example, creating the corresponding set of color or non-black toner registration marks CM relative to the black toner registration marks of the first set S1, and doing so in accordance with the first condition +0 of image misregistration. The method then includes the step of similarly forming multicolor registration marks MM from each of the at least second sets, S2, S3, S4 and S5 by creating at least the second set of color or non-black toner registration marks CM relative to each of the at least second sets, and doing so in accordance with the at least second condition −1U, −2U, +1U. and +2U of image misregistration. In a single pass process, different imaging assemblies form the black and non-black marks during the single pass, but it should be understood that in a multiple pass process, a single imaging assembly can do so during different passes.

As the margin area on which the multicolor registration marks are formed moves under the sensor 124, the method further includes the step of producing a first Ca1, and at least a second Ca2, Ca3, Ca4, Ca5 actual light reflectance measurement values from the various sets by the light source 142 illuminating the first S1, and the at least second S2, S3, S4 and S5 sets of multicolor registration marks MM on the surface 11. This step includes the sensor 124 sensing the diffuse reflectance from each of these illuminated sets of multicolor registration marks.

As shown in FIG. 7, where there is a condition of actual misregistration to the negative or to the first direction of FIG. 7 (that is, actual misregistration in addition to the built-in −2U, −1U, +0, +1U, +2U of the sets), there will consequently be less than the predetermined overlap of the marks within the sets S1, S2 and S4. As a result more of each color mark CM in these sets S1, S2, and S4 will be shifted leftwards (FIG. 7) into the otherwise non-reflective (surface 11) space between adjacent black marks BM. Such a shift therefore increases the area of unoccluded color toner therein for diffusing the illuminating light, and hence therefore increases (relative to Cp1, Cp2, Cp3), the amount of each of the actual light reflectance measurement values Cai (i=1, 2 4), Ca1, Ca2, Ca4 being put out by the sensor 124 for the sets S1, S2 and S4. To illustrate the effect of such a shift between the black and non-black marks in these sets, note in FIG. 7 that the actual misregistration is shown for example to have increased from +0U for set S1 to −½U; from −1U for set S2 to −1½U; and from −2U for set S4 to −2½U.

Meantime, the same situation of actual misregistration to the left or to the negative direction of FIG. 7 will have quite the opposite effect on the other sets S3, and S5 that are right of set S1. In each of these sets S3, S5, an actual shift of each color mark CM leftwards (FIG. 7) will result instead in greater overlap of the black and color marks, and hence instead cause less of the color mark CM (as compared to the predetermined built-in misregistration) to lie in the space between adjacent black marks. As a result, the actual light reflectance values Ca3, Ca5 produced therefrom as shown, will be less than the corresponding predetermined registration offset values Cp2, Cp3 for these sets. To illustrate the effect of such a shift between the black and non-black marks in these sets, note that the actual misregistration is shown for example to have decreased from +1U for set S2 to +½U; and from +2U for set S4 to +1½U.

On the other hand, as shown in FIG. 8, where there is actual misregistration to the positive or to the second direction of FIG. 8 (that is, actual misregistration in addition to the built-in −2U, −1U, +0, +1U, +2U of the sets) there will be an increase, hence more than the predetermined overlap of black and color marks in the sets S2, and S4. As a result, less of each color mark CM in these sets S2, and S4 will be misregistered or shifted leftwards (FIG. 8) into the otherwise non-reflective (surface 11) space between adjacent black marks BM. Such increased overlap decreases the area or amount of unoccluded color toner therein for diffusing the illuminating light, and hence also decreases (relative to Cp1, Cp2, Cp3), the amount of each of the actual light reflectance measurement values Cai' (i'=2'4'), Ca2', Ca4' being put out by the sensor 124 for the sets S2 and S4. To illustrate the effect of such a shift between the black and non-black marks in these sets S2, S4, note that the actual misregistration is shown for example to have decreased from −1U for set S2 to −½U; and from −2U for set S4 to −1½U.

Note that with respect to the +0 misregistration built-in first set S1, any shift to the left or right in the control direction Dr, Dr' will automatically place more of the color toner into spaces between black marks. This is illustrated by the condition of registration for set S1 going from +0U to +½U. As a result, there will also be an increase in actual light reflectance measurement value Ca1, regardless of whether the shift is in the negative or positive direction.

Meantime, the same situation of actual misregistration to the right or positive direction of FIG. 8 will (when compared to S2, S4) have the quite opposite effect on the other sets S3, and S5 that are right of S1. In each of these sets S3, S5, an actual shift of each color mark CM rightwards (FIG. 8) will result in less overlap between the black and color marks, and hence will cause more of the color mark CM (as compared to the predetermined built-in misregistration) to lie in the space between adjacent black marks. This is illustrated by the actual misregistration increasing from +1U to +1½U for S3, and from +2U to +2½U for set S5. As a result, the actual light reflectance measurement values Ca3', Ca5' produced therefrom will be more than the corresponding predetermined registration offset values Cp2, Cp3 for these sets.

The method next includes the step of comparing the produced first and at least second actual light reflectance measurement values, Ca1, Ca2, Ca3, Ca4 and Ca5, or Ca1, Ca2', Ca3' Ca4' and Ca5' to the stored predetermined first and at least second registration offset values Cp1, Cp2, Cp3 in order to determine for the one color of the color marks CM an actual measure or value of its misregistration relative to the black marks BM. To do so, the actual light reflectance measurement values therefrom are examined as a function of the corresponding registration offset values. An implied or average registration offset value that would correspond to an extremum (either minimum or maximum) light reflectance measurement value is determined for example, through interpolation or extrapolation. Such an extremum value is then used for controlling the adjustment to correct for registration of black and that color images to be formed subsequently. Although the extremum could be either a minimum or a maximum, the minimum would be preferable.

These values are obtained by interpolating or averaging light reflectance measurement values from a relatively large area covered by a number or series of marks rather than at a single line mark or edge. As a result, precise formation and precise development of each mark or edge is not necessary, and high precision and sensitivity of the optics and electronics of the sensors, are also not necessary. Finally, the method includes the step of adjusting responsively to the determined misregistration, an image creating parameter, such as timing or position in the process direction, or the cross-process position, of the at least second imager 40*a*, 40*b*, 40*c*, of the color printer, in order to thereby correct for such determined misregistration.

According to the present invention, the various non-black toner images have to calibrated for proper registration individually relative to the black toner image formed by imager 26 and developer unit 100. As such, one series of sets of multicolor registration calibration marks must be formed for each color consisting only of black marks BM and non-black marks CM of the particular color to be calibrated. Accordingly, three such series of sets of multicolor marks can be formed one after the other for use in a single pass of the belt 10 under the sensor 124, or any number of such series can be formed over a number of passes. The ESS 28 is programmable to identify and initiate the calibration of each color as above, and to do so with particular identification as to the control direction, that is, as to the process or cross-process directions Dr, Dr' respectively. This is important because the wide area beam (WAB) sensor 124 advantageously works off an amount of unoccluded non-black toner in an area of a set of registration calibration marks S1, S2, S3, S4 or S5 regardless of the direction in which the marks are laid. Again, each non-black color, cyan, magenta and yellow is calibrated and registration corrections made in advance of the appropriate imager forming the component image of that color within the image frame of a multicolor image being formed by the printer of the present invention. In a printer having a long image bearing member with multiple image frames in a series, such advance calibration can be carried out adjacent (that is in the margin of) an appropriate number of such image frames ahead of the frame for the particular multicolor to be formed.

After determining and correcting the registration of each color image such as that to be produced by the imager or imaging station 40*a* (FIG. 9) in accordance with the method of the present invention as above, the imaging station, for example 40*a*, then subsequently superimposes a second image of that color onto the black first image in an image frame of surface 11. The second image is then developed by an appropriate color toner developer unit shown as 100*a*. Still referring to FIG.9, developer unit 100*a* which is representative of the operation of development stations 100*b* and 100*c*, for example, includes a donor roll 102, electrode wires 104 and a magnetic roll 106. The donor roll 102 can be rotated either in the (with) or (against) direction relative to the motion of belt 10. Electrode wires 104 are located in the development zone defined as the space between photoconductive belt 10 and donor roll 102. The distance between wires 104 and donor roll 102 is approximately the thickness of the toner layer on donor roll 102. A voltage source electrically biases the electrode wires with both a DC potential and an AC potential. In operation, magnetic roll 106 advances developer material comprising carrier granules and toner particles into a loading zone adjacent donor roll 102. The electrical bias between donor roll 102 and magnetic roll 106 causes the toner particles to be attracted from the carrier granules to donor roll 102. Donor roll 102 advances the toner particles to the development zone. The electrical bias on electrode wires 104 detaches the toner particles on donor roll 102 and forms a toner powder cloud in the development zone. The discharged latent image attracts the detached toner particles to form a toner powder image thereon. The toner particles in developer unit 100*a* are, for example, of a color magenta.

Following development by the development unit 100*a*, the surface 11 of belt 10 is again recharged by the charging unit 32*b* and then advanced to the next imaging station 40*b*. At imaging station 40*b*, the imager there and/or the photoconductive belt 10 would have been re-registered according to the present invention using a series of sets of registration marks formed within the margin of an image frame that preceded the current frame and had passed the sensor 124, and all in advance of the latent color image now to be formed by imager 40*b*. The imager 40*b* then superimposes another latent color image by selectively discharging portions of the frame of the recharged photoconductive surface 11. An appropriate developer unit 100*b* then develops the formed latent color image for example with yellow toner. The belt 10 is thereafter again recharged by charging unit 32*c*. Reregistration, if necessary, of the belt 10 and imager 40*c* according to the present invention would have been carried out adjacent a leading frame using sensor 124 and registration marks formed in advance of current imaging by 40*c*. Imaging by imager 40*c* similarly involves superimposing a subsequent latent color image on the recharged imaged frame by selectively discharging appropriate portions of the recharged photoconductive frame. An appropriate developer unit 100*c* then develops this subsequent image for example with cyan toner.

The resultant image is a multi-color image by virtue of developments by the developing units 30, 100*a*, 100*b* and 100*c* which have black, yellow, magenta, and cyan, toner particles disposed therein. The resultant multicolor, and properly registered image according to the present invention, is then advanced to transfer station DD. At transfer station DD, a sheet or document is moved into contact with the multicolor toner image, and a corona generating device 41 charges the sheet to the proper magnitude and polarity as the sheet is passed through a transfer nip formed by photoconductive belt 10. The toner image is attracted from photoconductive belt 10 to the sheet. After transfer, a corona generator 42 charges the sheet to the opposite plurality to detack the sheet from belt 10. Conveyor 44 advances the sheet to fusing station EE.

Fusing station EE for example includes a fuser assembly indicated generally by the reference numeral 46, which permanently affixes the transferred toner powder image to the sheet. Preferably, fuser assembly 46 includes a heated fuser roll 48 and a pressure roll 50 with the powder image on the sheet contacting fuser roll 48. The pressure roll is cammed against the fuser roll to provide the necessary pressure to fix the toner powder image to the copy sheet. The fuser roll is heated for example internally by a quartz lamp. Release agent, stored in a reservoir, is pumped to a metering roll, and transferred to the fuser roll.

After fusing, the sheets are fed through a decurler 52. Decurler 52 bends the sheet in a first direction and puts a known curl in the sheet, and then bends it in the opposite direction to remove that curl.

Forwarding rollers 54 than advance the sheet to duplex turn roll 56. Duplex solenoid gate 58 guides the sheet to the finishing station FF or to duplex tray 60. At finishing station FF, sheets are stacked in a compiler to form sets of cut sheet. The sheets of each set are optionally stapled to one another. The set of sheets are then delivered to a stacking tray. In a stacking tray, each set of sheets may be offset from an adjacent set of sheets.

With continued reference to FIG. 9, duplex solenoid gate 58 directs the sheet into duplex tray 60. Duplex tray 60 provides an intermediate or buffer storage for those sheets that have been printed on one side on which an image will be subsequently printed on the second, opposed side thereof, i.e. the sheets being duplexed. The sheets are stacked in duplex tray 60 face down on top of one another in the order in which they are being printed.

In order to complete duplex printing, the simplex sheets in tray 60 are refed seriatim, by bottom feeder 62 from tray 60 back to transfer station DD via a conveyor 64 and rollers 66 for transfer of the toner powder image to the opposed side of the sheet. Inasmuch as successive sheets are fed from duplex tray 60, the proper or clean side of the sheet is positioned in contact with belt 10 at transfer station DD so that the toner powder image is transferred thereto. The duplex sheet is then fed through the same path as the simplex sheet to be advanced to finishing station FF.

Sheets are fed to transfer station DD from secondary tray 68. Secondary tray 68 includes an elevator driven by a bi-directional AC motor. Its controller has the ability to drive the tray up or down. When the tray is in the down position, stacks of sheets are loaded thereon or unload therefrom. In the up position, successive sheets may be fed therefrom by sheet feeder 70. Sheet feeder 70 is a friction retard feeder utilizing a feed belt and take-away rolls to advance successive sheets to transport 64 which advances the sheets to rolls 66 and then to transfer station DD.

Sheets may also be fed to transfer station DD from the auxiliary tray 72. Auxiliary tray 72 includes an elevator driven by bi-directional AC motor. Its controller has the ability to drive the tray up or down. When the tray is in the down position, stacks of sheets are loaded thereon or unloaded therefrom. In the up position, successive sheets may be fed therefrom by sheet feeder 74. Sheet feeder 74 is a friction retard feeder utilizing a feed belt and take-away rolls to advance successive sheets to transport 64 which advances the sheets to rolls 66 and to transfer station DD.

Secondary tray 68 and auxiliary tray 72 are secondary sources of sheets. A high capacity feeder indicated generally by the reference numeral 76, is the primary source of sheets. High capacity feeder 76 includes a tray 78 supported on elevator 80. The elevator is driven by a bi-directional AC motor to move the tray up or down. In the up position, the sheets are advanced from the tray to transfer station DD. A fluffer and air knife directs air onto the stack of sheets on tray 78 to separate the uppermost sheet from the stack of sheets. A vacuum pulls the uppermost sheet against the belt 81. Feed belt 81 feeds successive uppermost sheets from the stack to a take-away drive roll 82 and idler rolls 84. The drive rolls and modular rolls guide the sheet onto transport 86. Transport 86 advances the sheet to roll 66 which, in turn, move the sheet to transfer station DD.

After the sheet is separated from photoconductive belt 10, some residual toner particles in the image frame remain adhering thereto and the developed registration marks. After transfer, photoconductive belt 10 passes beneath corona generating device 94 which charges the residual toner particles to the proper polarity. Thereafter, the pre-charged array lamp (not shown), located inside photoconductive belt 10 discharges the photoconductive belt in preparation for the next imaging cycle. Residual particles and registration marks are removed from the photoconductive surface at cleaning station GG.

Cleaning station GG includes an electrically biased cleaner brush 88 and two de-toning rolls 90 and 92, i.e. waste and reclaim de-toning rolls. The reclaim roll is electrically biased negatively relative to the cleaner roll so as to remove toner particles therefrom. The waste roll is electrically biased positively relative to the reclaim roll so as to remove paper, debris and wrong sign toner particles. The toner particles on the reclaim roll are scrapped off and deposited in a reclaim auger (not shown), where it is transported out of the rear of the cleaning station GG.

While the wide area beam sensing apparatus and method for image registration calibration have been shown and described in a single pass Recharge, Expose and Develop (REaD) color electrophotographic printing machine, it should be understood that the invention could be used equally in a tandem or in any multiple pass color printing machine.

It is, therefore, apparent that there has been provided in accordance with the present invention, a wide area beam apparatus and method for determining image misregistration in a color printer, and for positionally adjusting imager units as well as tracking a moving photoconductive belt so as to fully satisfy the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A wide area beam (WAB) sensing method of calibrating for image registration in a color printer having an electronic control subsystem, the method comprising the steps of:

(a) storing in the electronic control subsystem a first and at least a second predetermined registration area offset values corresponding to a first condition of image misregistration and to at least a second different condition of image misregistration, by the printer;

(b) first creating a first set of light non-reflecting black toner registration calibration marks on a first wide area of a margin of a desired imaging area of an image bearing member and at least a second set of light non-reflecting black toner registration calibration marks on at least a second wide area of the margin of the desired imaging area of the image bearing member;

(c) next forming a first set of multi-color registration calibration marks by creating a set of light reflecting non-black toner registration marks over black toner marks of said first set of black toner marks so that each mark of the non-black toner marks corresponding to a black toner mark is misregistered in accordance with the first condition of image misregistration relative to such black toner mark of the first set of black toner marks;

(d) then forming at least a second set of multicolor registration calibration marks by creating another set of the light reflecting non-black toner registration marks over black toner marks of said second set of black toner marks so that each mark of non-black toner marks of said another set corresponding to a black toner mark is misregistered in accordance with the second condition of image misregistration relative to such black toner mark of the at least second set of black toner marks;

(e) producing a first and at least a second actual light area reflectance measurement values by illuminating the first and the at least second sets of multicolor registration calibration marks, and sensing from each set of multicolor registration calibration marks diffuse reflectance from areas of non-black toner marks not occluded by corresponding black toner marks;

(f) comparing the produced first and at least second actual light area reflectance measurement values to the stored predetermined first and at least second registration area offset values so as to determine an actual measure of image misregistration; and (g) adjusting an image forming parameter of the color printer responsively to the determined actual measure of image misregistration, thereby correcting for such determined actual image misregistration.

2. The method of claim 1, wherein said creating step comprises the step of creating the first set of registration calibration marks on the first wide area, and four additional sets of registration calibration marks on four additional wide areas of the image bearing member.

3. The method of claim 1, wherein said creating step comprises the step of creating the first set of registration calibration marks so as to include a plural number of spaced apart line marks in the first set, and the at least second set of registration calibration marks so as to include a plural number of spaced apart line marks in each of the at least second sets.

4. The method of claim 1, wherein said next forming step and then forming steps comprise the step of creating sets of non-black toner marks that are each equal in dimension to the corresponding black toner mark only in the direction of image registration calibration in order to isolate misreigistration in the calibration direction.

5. A color printer comprising:

(a) an image bearing member having a photoreceptive imageable surface for movement along a preselected path;

(b) first means for forming on a different wide area of a margin of a desired imaging area of the imageable surface a plural number of first sets of black toner registration calibration marks, each said set including multiple spaced apart marks;

(c) second means for forming a plural number of second sets of non-black toner registration calibration marks over said first sets of black toner registration calibration marks and so that each mark of the non-black toner marks corresponding to a black toner mark is misregistered to such black toner mark in accordance with predetermined built-in different conditions of image misregistration between light reflecting and corresponding light non-reflecting multicolor registration calibration marks;

(d) a light source for producing a wide area beam of light for illuminating each set of said plural number of sets of multicolor marks so that light from such beam falls on and is reflected from areas of non-black toner marks not occluded by corresponding black toner marks;

(e) a wide area beam (WAB) sensor for producing an actual light area reflectance measurement value from each said illuminated set of multicolor marks by measuring light reflected from nonoccluded areas of each said illuminated set of said plural number of sets of multicolor marks;

(f) a comparing device for determining a degree of actual misregistration between said first sets of black toner marks and said second sets of non-black toner marks of each illuminated set of multicolor marks corresponding to each predetermined condition of image misregistration by comparing said actual light area reflectance measurement value from said each illuminated set with the stored predetermined registration area offset value for said set; and (g) mechanisms for adjusting an image forming parameter of at least one of said first means and said second means responsively to said determined degree of actual misregistration so as to correct for said determined actual misregistration.

6. The color printer of claim 5, wherein said wide area beam sensor includes;

(a) a collimating lens;

(b) a collecting lens for collecting reflected light rays; and (c) a photosensor array for receiving reflected light rays being transmitted through said collecting lens to generate (i) a total signal proportional to a total flux of said light rays being transmitted through said collecting lens, and (b) a diffuse signal proportional to a diffuse component of the total flux.

7. The color printer of claim 5, wherein said wide area beam sensor is mounted within the printer at a diffuse angle relative to said light source.

8. The color printer of claim 7, wherein said light source is built into said wide area beam sensor.

9. The color printer of claim 5, wherein said wide area beam sensor is mounted within the printer at a location downstream of imager assemblies for forming in proper registration different color component images so as to enable image registration calibration, misregistration correction, and image formation in a single pass.

10. The color printer of claim 5, including a controller for controlling said first means and said second means for forming a plural number of sets of toner registration calibration marks to selectively (a) form series of sets of registration calibration marks comprising lines running orthogonally to a process direction for calibrating process direction registration, as well as (b) form series of sets of registration calibration marks comprising lines running orthogonally to a cross-process direction for calibrating cross-process direction registration in the printer.

11. The color printer of claim 5, wherein said light source comprises an erase lamp also usable for erasing charges from portions of the photoreceptor.

12. The color printer of claim 5, wherein said image bearing member is translucent and said light source is mounted to a backside of the image bearing member.

13. The color printer of claim 12, wherein said predetermined different conditions of image misregistration include −2U, −1U, 0U, +1U, and +2U where 'U' is a unit of measure of image misregistration.

14. The color printer of claim 5, wherein said plural first sets of black toner marks include five sets.

* * * * *